(12) United States Patent
Maillaut (10) Patent No.: US 9,988,149 B2
(45) Date of Patent: Jun. 5, 2018

(54) INTERIOR LAYOUT ASSEMBLY OF AN AIRCRAFT CABIN, AND RELATED METHOD

(71) Applicant: DASSAULT AVIATION, Paris (FR)

(72) Inventor: Yann Maillaut, Chambourcy (FR)

(73) Assignee: DASSAULT AVIATION, Paris (FR)

( * ) Notice: Subject to any disclaimer, the term of this patent is extended or adjusted under 35 U.S.C. 154(b) by 320 days.

(21) Appl. No.: 15/010,722

(22) Filed: Jan. 29, 2016

(65) Prior Publication Data

US 2016/0221678 A1 Aug. 4, 2016

(30) Foreign Application Priority Data

Feb. 4, 2015 (FR) .................................... 15 00208

(51) Int. Cl.
*B64D 11/00* (2006.01)
*B64D 11/06* (2006.01)

(52) U.S. Cl.
CPC ...... *B64D 11/0638* (2014.12); *B64D 11/0605* (2014.12)

(58) Field of Classification Search
CPC ........................ B64D 11/0638; B64D 11/0605
See application file for complete search history.

(56) References Cited

U.S. PATENT DOCUMENTS

| | | | |
|---|---|---|---|
| 1,903,900 A | 7/1932 | Martin | |
| 2,947,348 A * | 8/1960 | Peckham | A47C 7/70 297/145 |
| 3,583,760 A * | 6/1971 | McGregor | A47B 5/006 297/145 |
| 5,487,342 A * | 1/1996 | Mack | A47B 5/04 108/40 |
| 7,721,657 B2 | 5/2010 | Carstensen | |
| 9,731,829 B2 * | 8/2017 | Gow | B64D 11/0638 |
| 9,783,303 B2 * | 10/2017 | Gagnon | B64D 11/0638 |
| 2008/0092784 A1 * | 4/2008 | Merensky | B64D 11/06 108/91 |
| 2009/0078169 A1 * | 3/2009 | Osborne | A47B 5/006 108/40 |
| 2009/0107366 A1 * | 4/2009 | Fissette | B64D 11/0007 108/115 |

(Continued)

FOREIGN PATENT DOCUMENTS

| | | |
|---|---|---|
| FR | 2 841 510 A1 | 1/2004 |
| FR | 2 802 070 A1 | 10/2008 |

OTHER PUBLICATIONS

Search report for priority application FR 1500208.

*Primary Examiner* — Philip J Bonzell
*Assistant Examiner* — Michael B Kreiner
(74) *Attorney, Agent, or Firm* — Davidson, Davidson & Kappel, LLC (57) ABSTRACT

An interior layout assembly of an aircraft cabin, and related method are provided. The assembly includes a table, a console defining a receiving housing and a cover mounted on the console. The cover in the closed configuration and the console define a passage slot between them. The assembly also includes a flap closing off the passage slot, movable by the table from an active configuration closing the passage slot to a retracted configuration freeing the passage slot during the passage of the table from its retracted position to the deployed position.

15 Claims, 5 Drawing Sheets

(56) References Cited

U.S. PATENT DOCUMENTS

| | | | |
|---|---|---|---|
| 2010/0326331 A1* | 12/2010 | St. Louis | B64D 11/00 108/44 |
| 2010/0326333 A1* | 12/2010 | St. Louis | B64D 11/06 108/44 |
| 2012/0133180 A1* | 5/2012 | Moulton | B64D 11/06 297/135 |
| 2016/0221677 A1* | 8/2016 | Hance | B64D 11/0605 |
| 2016/0340041 A1* | 11/2016 | Peuziat | B64D 11/0015 |
| 2017/0088268 A1* | 3/2017 | Kinard | B64D 11/0638 |

* cited by examiner

INTERIOR LAYOUT ASSEMBLY OF AN AIRCRAFT CABIN, AND RELATED METHOD

This claims the benefit of French Patent Application FR 15 00208, filed Feb. 4, 2015 and hereby incorporated by reference herein.

The present invention relates to an interior layout assembly of an aircraft cabin, comprising:
a table,
a console defining a housing for receiving the table emerging through a deployment opening, the table being deployable through the deployment opening between the retracted position arranged in the receiving housing and a deployed horizontal position; and
a cover, mounted on the console, the cover being movable between an open configuration for passage of the table and a closed configuration closing off the deployment opening.

Such an assembly is designed to be mounted in an aircraft cabin to contribute to the comfort of the occupants of the cabin.

BACKGROUND

During a flight at cruising altitude, the passengers of an aircraft wish to have a table to perform various activities, such as working, eating, or more generally to hold various objects, such as books, portable electronic devices, etc.

For safety reasons, aircraft certification requires that each table present in the aircraft be retracted during certain flight phases, in particular during takeoff and landing.

Also in some cases, passengers may wish, for their own comfort, for the table to be retracted, for example so as to deploy a seat in order to lie down.

Known interior layout assemblies therefore comprise a lateral console defining a housing for receiving the table and a table retractable in the lateral console.

In these assemblies, a cover mounted on the console closes off the housing in the upward direction when the table is retracted, which provides an agreeable interior appearance.

In order to deploy the table, the cover is tilted to the open position, and remains kept in the open position once the table is deployed. The table then rests on the upper plate of the lateral console, protruding relative to the upper plate.

Such an assembly is not fully aesthetically satisfactory when the table is deployed. The cover remains open in this configuration and protrudes above the plate of the table. This is not very aesthetically pleasing, and limits the accessibility to the area behind the support plate, and in particular to the object holding compartments that may be present behind the support plate.

Furthermore, the plate of the table is not flush with the upper plate of the lateral console. Additionally, the hinges of the deployment mechanism of the table are visible to the user.

SUMMARY OF THE INVENTION

An object of the invention is therefore to improve the aesthetic appearance of an interior layout assembly of an aircraft cabin comprising a deployable table, notably when the table is deployed.

To that end, an assembly of the aforementioned type is provided, characterized in that the cover in the closed configuration and the console define a passage slot between them, able to receive the table in the deployed horizontal position, the assembly comprising a flap closing off the passage slot, movable by the table from an active configuration closing the passage slot to a retracted configuration freeing the passage slot during the passage of the table from its retracted position to its deployed position.

The assembly according to the invention may comprise one or more of the following features, considered alone or according to any technically possible combination:
at least one elastic return mechanism for returning the closing flap to its active configuration.
the closing flap in the active closing configuration is situated above the closing flap in the retracted configuration.
the table is able to bear on the closing flap during its passage from the retracted position to the horizontal deployed position to push the closing flap downward in the retracted configuration under the effect of the weight of the table.
the closing flap and/or the table includes a least one member for sliding of the table on the closing flap.
the closing flap can be moved in translation between the active closing configuration and the retracted configuration.
the console has a stationary upper edge, downwardly defining the passage slot, the table bearing on sliding members situated on the closing flap in the deployed horizontal position, advantageously without contact with the upper edge of the console.
the cover in the closed configuration is arranged above an upper surface of the table when the table is in the deployed horizontal position, the cover upwardly closing off the receiving housing.
the cover in the closed configuration is positioned above the closing flap when the table is in the retracted position, the cover closing off the upward receiving housing.
the console has an upper surface for bearing objects, an upper wall of the cover in its closed configuration being flush with the upper bearing surface.
the table includes a base panel and an additional panel articulated on the base panel, the additional panel being folded on the base panel during the passage of the table from the retracted position to the deployed horizontal position.
the assembly comprises:
a stationary frame, the table being able to be deployed relative to the frame between the retracted position and the horizontal deployed position;
a mechanism for guiding the movement of the table relative to the frame between the retracted position and the deployed horizontal position.
the guide mechanism defining at least one bearing point for the table during its passage from the retracted position to the deployed horizontal position, the bearing point having a globally invariable position relative to the frame, the table being configured to pivot on the bearing point while moving laterally away relative to the bearing point, by sliding on the bearing point, to the deployed position.
the or each bearing point protrudes upward relative to the frame.
the guide mechanism includes a bearing member mounted rotating around a stationary axis relative to the frame, the bearing point being defined on the bearing member.
the table includes a guide path for guiding the sliding of the table on the bearing point.
the bearing point cooperates with the guide path.
the guide mechanism comprises a rail inserted in the table, the rail defining the guide path.
the table is able to press on the bearing point from the retracted position to the deployed horizontal position, the guide mechanism being configured so that the table follows a unique and reproducible trajectory from the retracted position to the deployed horizontal position.

the frame includes at least one substantially vertical leg, the guide mechanism comprising at least one guide path for guiding the table along the leg.

the guide path is arranged through the leg, the guide mechanism including a guide member movable jointly with the table, the guide member being mounted in the guide path.

the guide mechanism comprises a rack, the guide member comprising a toothed wheel.

the table includes a carriage, the guide member being mounted rotating in the carriage.

the upper end of the guide path is laterally offset relative to a vertical axis passing through the bearing point, the guide path being inclined relative to the vertical axis passing through the bearing point or being parallel to the vertical axis passing through the bearing point.

the guide mechanism includes at least one elastic biasing member able to drive the table upward relative to the frame.

the elastic biasing member is mounted in the carriage between the guide member and the carriage.

The invention also provides an interior layout method of an aircraft cabin, comprising the following steps:

providing an assembly as defined above, the table being in its retracted position in the receiving housing, the closing flap being in its active configuration for closing the passage slot;

deploying the table outside the receiving housing through the deployment opening toward the deployed position;

moving the closing flap by the table during its deployment to move the closing flap to its retracted configuration.

The assembly according to the invention may comprise one or more of the following features, considered alone or according to any technically possible combination:

it comprises the following steps:
retracting the table in the receiving housing through the deployment opening toward the retracted position;
moving the closing flap from its retracted configuration to its active configuration closing the passage slot, advantageously under the effect of an elastic biasing mechanism of the closing flap toward its active closing configuration.
the table bears on the closing flap during its deployment toward the deployed horizontal position, the movement of the closing flap by the table being generated by the weight of the table pressing on the closing flap.

BRIEF SUMMARY OF THE DRAWINGS

The invention will be better understood upon reading the following description, provided solely as an example and done in reference to the appended drawings, in which.

DETAILED DESCRIPTION

Below, the terms "rear" and "front" are each to be understood generally relative to the deployment of the table. The term "rear" is preferably to be understood as being closer to the table in its retracted position, while the term "front" is to be understood as being closer to the table in its deployed position.

An interior layout assembly 10 of an aircraft cabin 12 according to an embodiment of the invention is illustrated by FIGS. 1 to 8.

Figure 1:
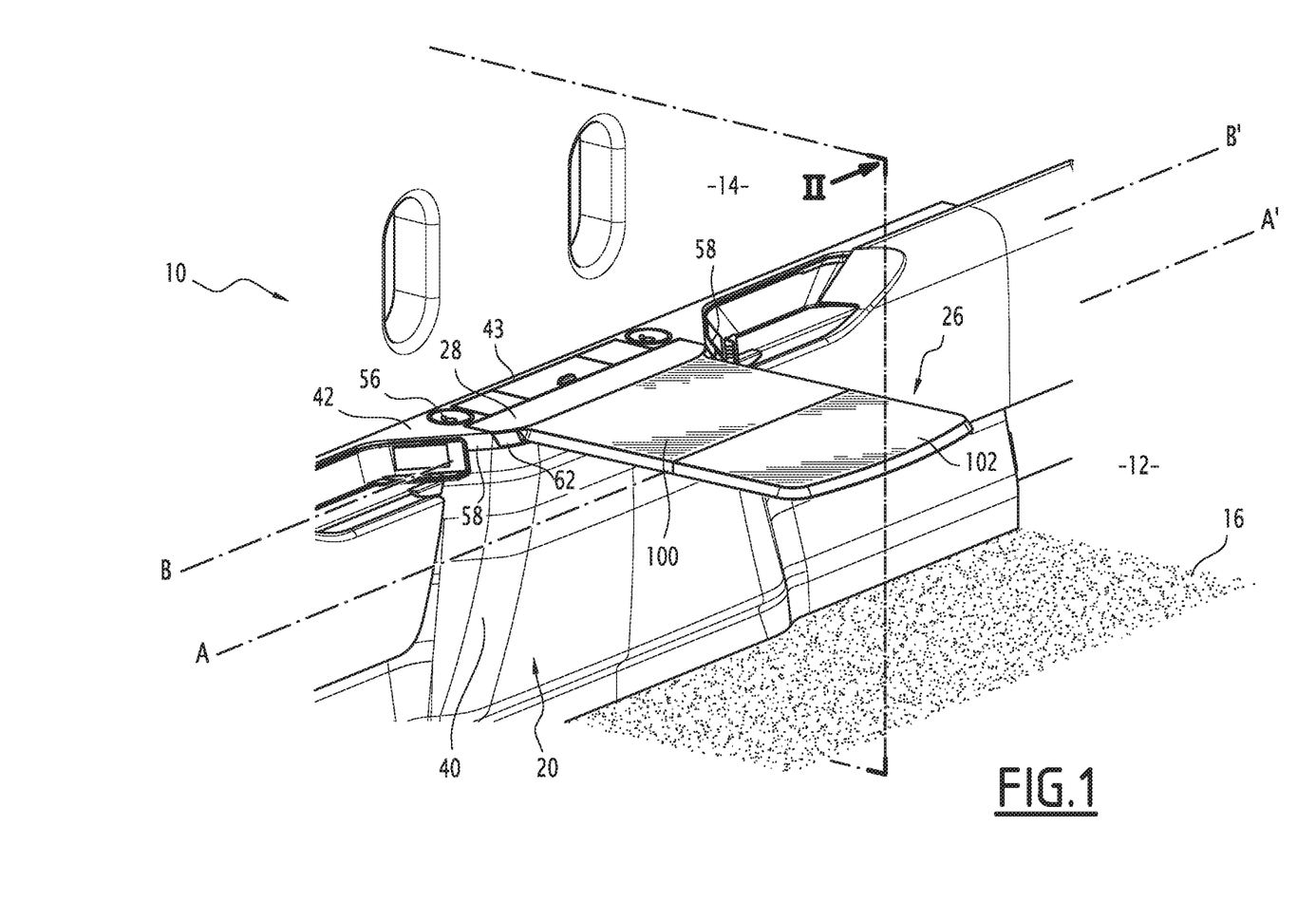
FIG. 1 is a perspective view, partially from above, of a first interior layout assembly according to the invention, the table being in a deployed horizontal position.

The cabin 12 of the aircraft is laterally defined by the fuselage 14 and downwardly defined by a floor 16. It extends here along an axis A-A'.

The layout assembly 10 is mounted in the cabin 12 to be accessible to the occupants of the cabin 12. It includes a console 20, and a support device 22, visible in FIG. 6, in particular including a frame 24 housed in the console 20 and a table 26 deployable between a position retracted in the console 20 and a deployed horizontal position, shown in FIG. 1.

The layout assembly 10 further includes a cover 28 for concealing the support device 22 in the retracted position of the table 26, and a retractable flap 30 for additional closure, mounted between the console 20 and the cover 28, the structure and function of which will be described in detail below.

In the example shown in FIG. 1, the console 20 extends along a main horizontal axis B-B' advantageously substantially parallel to the longitudinal cabin axis A-A', along the fuselage 14. Other orientation configurations of the console 20 are also possible.

The console 20 comprises a rounded flank 40 extending substantially vertically and an upper support plate 42 defining a substantially horizontal object support surface 43.

Figure 5:
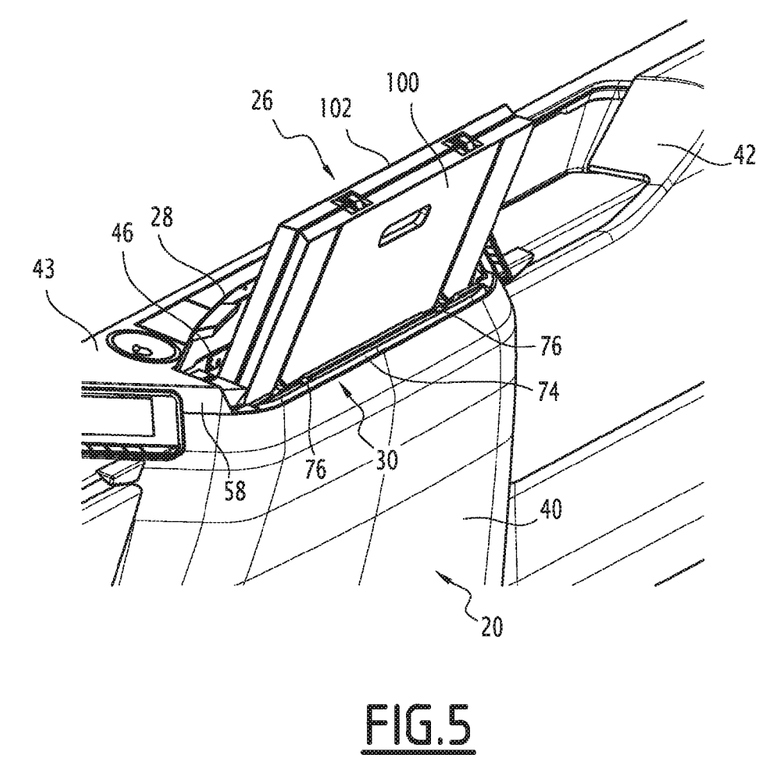
FIG. 5 is a perspective top view of the assembly of FIG. 1, during the deployment of the table.

The console 20 defines a housing 44 for receiving the support device 22, which here emerges upwardly through a deployment opening 46, visible in FIG. 5.

Figure 3:
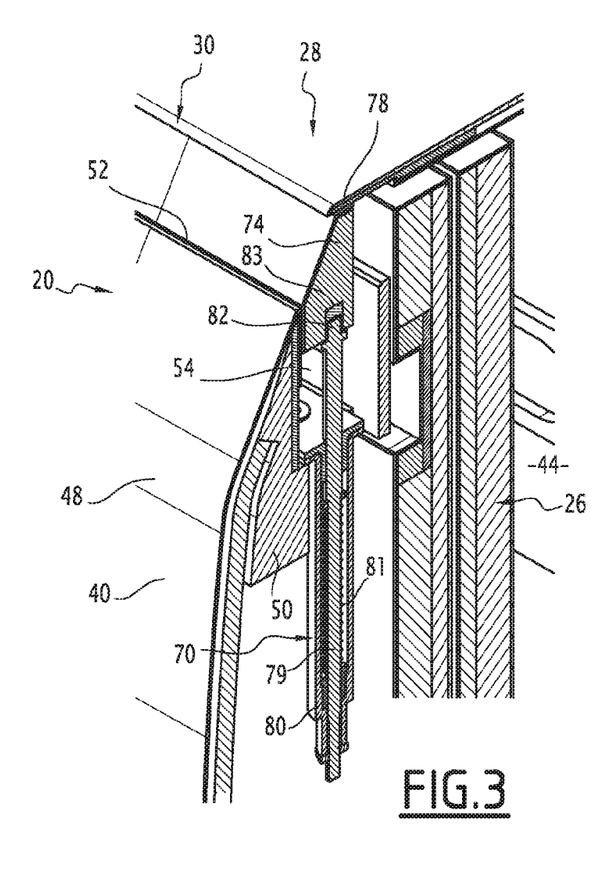
FIG. 3 is a view similar to FIG. 2, the table being in a retracted position.

In reference to FIG. 3, the flank 40 comprises an outer trim 48 and an inner support 50 for guiding the closing flap 30, positioned near an upper edge 52 of the console 20, which here has a more slender upper shape.

The inner support 50 is positioned in the housing 44, behind the trim 48. It defines a cavity 54 for sliding of the closing flap 30.

The upper plate 42 defines, behind the housing 44, a plurality of compartments for receiving objects 56, some of which are closed off by a flap.

It has two lateral bearing tongues 58, extending on both sides of the deployment opening 46, around the cover 28.

The receiving housing 44 is laterally defined by the console 20. It is upwardly defined by the support plate 42, behind the deployment opening 46, on the side of the fuselage 14 in FIG. 1. It extends substantially vertically from the floor 16 to the deployment opening 46.

The cover 28 is designed to upwardly close off the housing 44 at the deployment opening 46, in the retracted position of the table 26, and also in the deployed horizontal position of the table 26.

The cover 28 is movable between an open configuration for passage of the table 26 and a closed configuration closing off the deployment opening 46.

In this example, the cover 28 is articulated on the console 20 around a hinge pin. Advantageously, the hinge pin is parallel to the main axis B-B'. It extends behind the deployment opening 46.

The cover 28 includes an upper concealing wall 60, and in this example, two lateral feet 62, designed to be positioned around the table 26 in its deployed position.

In the closed configuration, the upper wall 60 is flush with the upper surface 43 of the support plate 42. It is positioned above the table 26. It has a local thickness smaller than that of the table 26 in the region in which it rests.

The feet 62 are positioned bearing on the upper edge 52 of the console 20.

Figure 4:
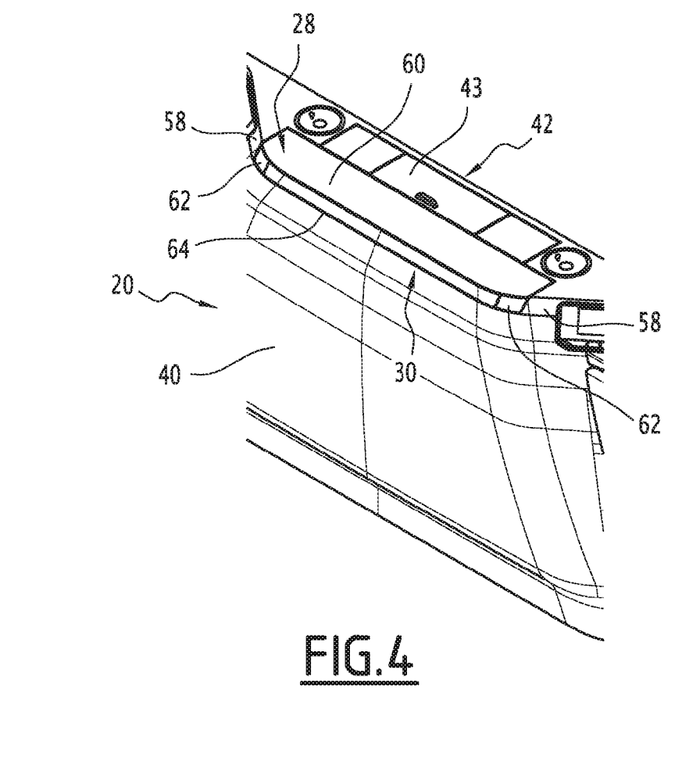
FIG. 4 is a perspective top view similar to FIG. 3.

In this configuration, the cover 28 and the console 20 define a horizontal slot 64 between them for the passage of the table 26, the outline of which is shown in FIG. 4.

The slot 64 is defined downwardly by the upper edge 52, upwardly by the upper wall 60 of the cover 28, and on the sides, by the feet 62.

The housing 44 is then upwardly closed off by the cover 28, in particular at the deployment opening 46, with the exception of the slot 64.

As will be seen below, the table 26 is engaged through the slot 64 in the deployed horizontal position. The closing flap 30 closes off the slot 64 in the retracted position of the table 26.

In the open configuration, shown in FIG. 5, the cover 28 has been removed and tilted backward to free the deployment opening 46 and allow access to the housing.

Figure 2:
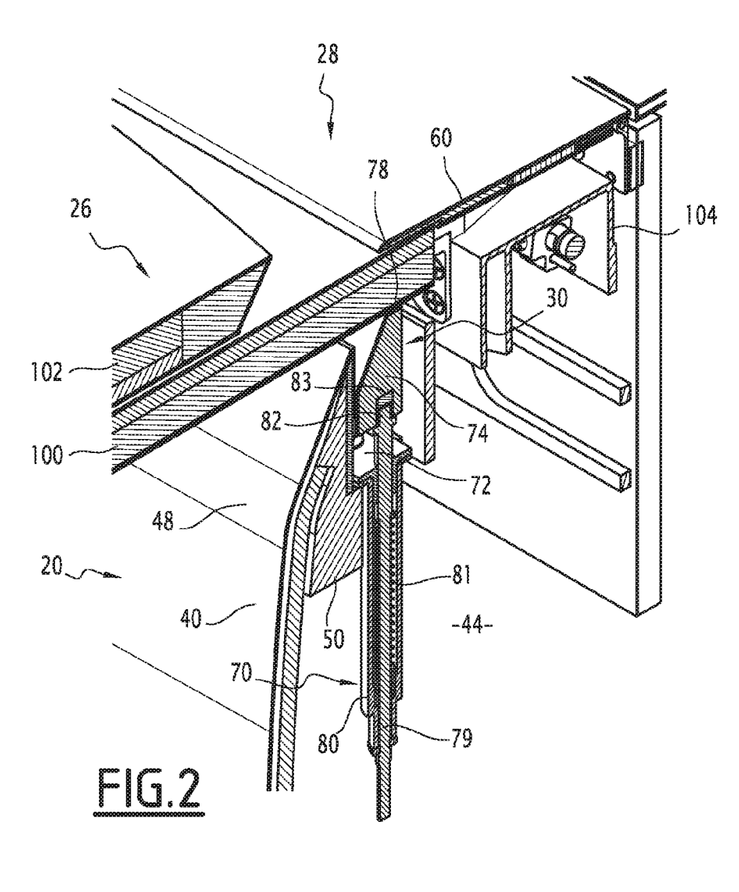
FIG. 2 is a partial view, in cross-section along a vertical plane II, of the interior layout assembly of FIG. 1.

The closing flap 30 is mounted vertically movably on the console 20 between an active configuration closing the slot 64, being its idle configuration, shown in FIG. 3, and a retracted configuration freeing the slot 64, shown in FIG. 2. The layout assembly 10 includes at least one elastic biasing mechanism 70 for biasing the flap 30 toward its active configuration closing the slot 64, advantageously at least two parallel mechanisms 70 for elastically biasing the flap 30 toward its active configuration closing off the slot 64.

The flap 30 includes a trim strip 74 able to protrude in the passage slot 64, and advantageously at least one member 76 for sliding of the table 26 on the strip 74, shown in FIG. 5.

The strip 74 is guided in translation along a vertical axis in the cavity 54 of the inner support 50. The movement of the closing flap 30 between the active closing configuration and the retracted configuration is therefore done exclusively in translation along this axis. The flap 30 therefore forms a retractable guillotine for closing off the slot 64.

The trim strip 74 has a slender shape that extends the shape of the upper edge 52 of the console 20. It has a substantially horizontal upper edge 78.

The closing flap 30 includes at least one sliding member 76. In this example, the closing flap 30 includes two sliding members 76 spaced apart along the trim strip 74.

Each sliding member 76 is mounted in the trim strip 74 while protruding from the upper edge 78. In this example, each sliding member 76 is formed by a caster mounted rotating in the trim strip 74.

In reference to FIG. 2 and FIG. 3, each elastic biasing mechanism 70 includes a movable rod 79 for moving the flap 30, a base 80 for guiding the rod 79, mounted stationary on the console 20, and a spring 81 inserted between the console 20 and the flap 30, advantageously between the base 80 and the rod 79.

The base 80 includes a bush supported by the inner support 50 and members for guiding the vertical translation of the rod 79 in the bush.

The rod 79 is mounted in vertical translation in the base 80. It includes an upper end-of-travel stop, limiting its upward travel. It has a head 82 mounted in a housing 83 of the strip 74.

A spring 81 is inserted between the rod 79 and the base 80. It continuously biases the rod 79 upwards.

In the active closing configuration, shown in FIG. 3, the closing flap 30 protrudes vertically in the slot 64. The strip 74 is outwardly flush with the trim 48 of the console 20 at the upper edge 52. The upper edge 78 of the strip 74 is positioned below the upper wall 60 of the concealing cover 28 at that wall 60, without contact between the sliding members 76 and the wall 60.

As illustrated in FIG. 4, the slot 64 and the housing 44 are then completely upwardly closed off by the cover 28 and by the closing flap 30 in the slot 64, above the console 20. The outer appearance of the layout assembly 10 is therefore very satisfactory.

In the retracted configuration, when the table 26 is placed in the slot 64, the weight of the table 26 pushes the strip 74 downwards against the elastic biasing mechanism 70. The upper edge 78 of the strip is then lowered substantially to the same level as the upper edge 52 of the console 20. The table 26 is positioned between the horizontal upper wall 60 of the concealing cover 28 in the closed configuration and the upper edge 78 of the closing flap 30, offering a very satisfactory outer appearance.

Figure 6:
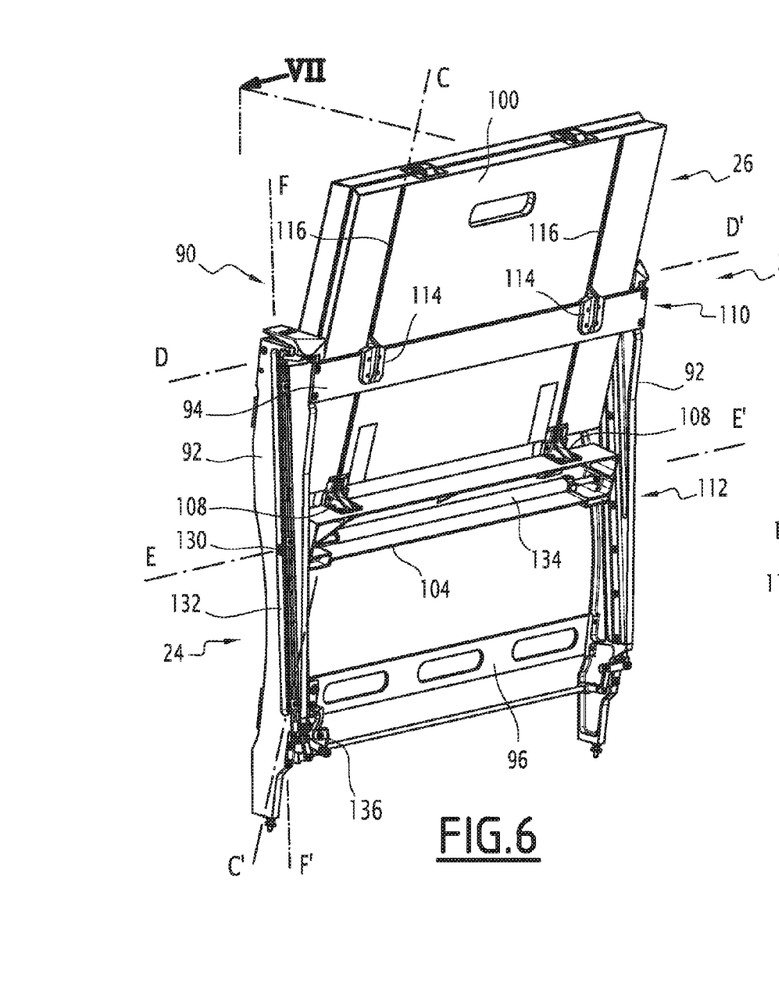
FIG. 6 is a view of the support device comprising the table and the guide frame of the table during the deployment of the table.

As indicated above, and in reference to FIG. 6, the support base 22 includes the frame 24 and the table 26 mounted moving on the frame 24 between the retracted position and the deployed position.

The support device 22 includes a guide mechanism 90 for guiding the movement of the table 26 relative to the frame 24, able to guide the table 26 over a unique trajectory relative to the frame 24 between the retracted position and the deployed position.

The frame 24 is completely received in the receiving housing 44 to be concealed by the concealing cover 28 in the retracted position and in the deployed horizontal position.

As illustrated by FIG. 6, the frame 24 includes two parallel legs 92, placed on both sides of the table 26, and at least one upper bearing crosspiece 94 of the table 26, connecting the two legs 92. It advantageously includes at least one lower stiffening crosspiece 96 transversely connecting the two legs 92.

Each leg 92 here has a thinner lower region 95 toward the rear to limit the bulk of the frame 90 and allow the passage of functional elements of the aircraft, such as cables, behind the frame 90.

In this example, the frame 24 includes two parallel lower crosspieces 96 respectively mounted in front of and behind the legs 92.

The upper crosspiece 94 extends horizontally, near the upper ends of the legs 92.

The table 26 comprises at least one panel 100, 102 designed to extend horizontally in the deployed horizontal position. It advantageously includes a rear carriage 104 for connecting with the frame 24.

In this example, the table 26 comprises a base panel 100 and an additional panel 102, articulated on the base panel 100 around a horizontal axis between a position folded on the base panel 100, and an unfolded position from the base panel 100.

The base panel 100 has a cross-section substantially complementary to that of the passage slot 64 to occupy the entire passage slot 64 in the deployed horizontal position.

In the folded position, the additional panel 102 is pressed above the base panel 100. In the folded position, the additional panel 102 horizontally extends the base panel 100 away from the frame 24.

The rear carriage 104 is mounted sliding along the legs 92. It is connected to the base panel 100 by brackets 108. It is jointly translatable and rotatable with the base panel 100.

The guide mechanism 90 comprises an upper assembly 110 for guiding the base panel 100 relative to the frame 24, and a lateral assembly 112 for guiding the carriage 104 relative to the frame 24.

As illustrated by FIG. 6, the upper assembly 110 includes at least one bearing member 114, secured to the frame 24, defining a bearing point 123 of the table 26 during its movement between the retracted position and the deployed position. It includes, for each bearing member 114, a guide path 116 arranged below the table 26, to receive the bearing member 114 and keep the position of the bearing point 123 globally invariable.

In this example, the upper assembly 110 includes two separate bearing members 114 respectively received in two parallel guide paths 116.

Figure 7:
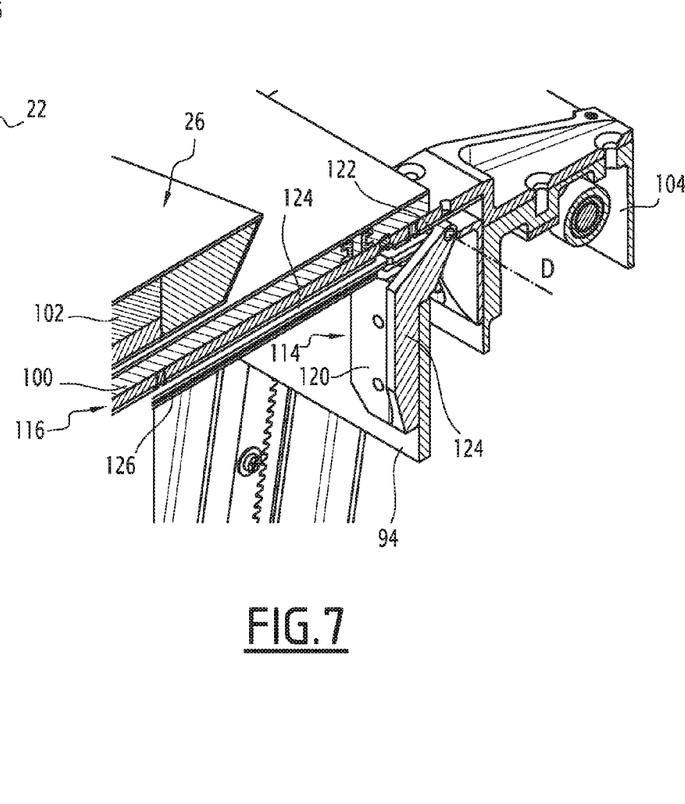
FIG. 7 is a perspective and partial cross-sectional view along a vertical plane VII of the support device of FIG. 6, in the deployed horizontal position of the table.

In reference to FIG. 7, each bearing member 114 includes a bracket 120 attached on a crosspiece 94 and a rotating element 122, here a bronze ring, mounted rotating on the bracket 120.

Each bearing member 114 defines a bearing point 123 with a globally invariable position relative to the frame 24, on which the table 26 rests. Here, the bearing point 123 is situated on the outer surface of the rotating element 122, away from the rotation axis D-D' of the rotating element 122.

"Globally invariable" means that the position of the bearing point 123 of the table 26 on the bearing member 114 remains identical even when the rotating element 122 rotates around its axis D-D' and when the table 26 moves away from the bearing member 114.

The rotating element 122 protrudes above the crosspiece 94, such that the bearing point 123 is situated above the crosspiece 94.

Each guide path 116 includes a hollow rail 124 arranged in the table 26, below the base panel 100, and at least one retaining blade 126 for retaining the rotating element 122 of the bearing member 114, protruding across from the hollow rail 124, to partially downwardly close the hollow rail 124.

Each guide path 116 extends along a deployment axis C-C' substantially perpendicular to the main axis B-B'.

The rotating element 122 is able to slide in the hollow rail 124 along the axis C-C' while being retained between the blade 126 and the bottom of the rail 124.

Thus, in each position of the table 26 from its retracted position to its deployed position, at least one point of the table 26 remains positioned bearing on the bearing point 123 defined by the bearing member 114.

The bearing members 114 define a pivot axis of the table 26 relative to the frame 24, which here is substantially parallel to the main axis B-B', and to the rotation axis D-D' so that the table 26 deploys laterally relative to the console 20.

The table 26 therefore follows a stationary and reproducible trajectory relative to the frame 24 from its retracted position to its deployed position and in the opposite direction, from its deployed position toward its retracted position.

The lateral guide assembly 112 includes, for each leg 92, a guide member 130 supported by the carriage 104, a guide path 132 arranged in the leg 92 along the latter, and a rack 133 able to cooperate with the guide member 130.

The lateral guide assembly 112 further includes an elastic biasing member 134, housed in the carriage 104, able to bias the table 26 away from its retracted position, and a mechanism 136 for keeping the table 26 in its retracted position.

In this example, each guide member 130 is mounted rotating in the carriage 104 around an axis E-E' parallel to the main axis B-B'. The guide members 130 are mounted at opposite ends of a shared shaft 135, received in the carriage 104. The shaft 125 is mounted rotating around the axis E-E' relative to the carriage 104.

The guide path 132 is arranged longitudinally in the leg 92 along an axis F-F' inclined toward the rear relative to a vertical axis passing through the bearing point 123, by an angle advantageously smaller than 10°.

The guide path 132 has an upper end laterally offset toward the rear relative to the vertical axis passing through the bearing point 123. The incline of the path 132 and the position of its upper end allow the table 26 to pivot around the bearing point 123, while moving away from the bearing point 123 along the deployment axis C-C'.

The rack 133 extends along the path 132.

The guide member 130 is formed by a toothed wheel able to cooperate with the rack 133 to allow the translational driving of the table 26 along the axis F-F' by means of the carriage 104.

The elastic biasing member 134 is advantageously formed by a torsion spring inserted between each guide member 130 and the carriage 104, by means of the shaft 135. It is received in the carriage 104.

The torsion of the spring increases when the table 26 is in its retracted position and decreases during movement of the table 26 toward the deployed position, under the effect of the rotation of each guide member 130 relative to the carriage 104.

Thus, the deployment of the elastic biasing member 134 is able to rotate the shaft 135, and jointly, the guide members 130. The guide members 130 then rise along the rack 133 in each guide path 132 driving the carriage 104 and the panels 100, 102 of the table 26 upward.

The retaining mechanism 136 is able to selectively keep the table 26 in its retracted position against the biasing of the member 134. It is able to be released by an occupant of the cabin 12, for example by actuating a command button.

The operation of the layout assembly 10 according to an embodiment of the invention will now be described.

Initially, the table 26 is in its retracted position in the receiving housing 44. The panels 100, 102 are folded on one another. The retaining mechanism 136 is active. The rotating members 130 are situated in a lower part of each guide path 132. The elastic biasing of the member 136 is maximal.

In the retracted position, the table 26 is inserted in the frame, between the legs 92. It occupies a vertical position or a position inclined by an angle smaller than 10° relative to a vertical axis.

As shown in FIG. 3 or FIG. 4, the cover 28 upwardly closes off the receiving housing 44. The table 26 being positioned away from the closing flap 30, it is not pressed on the latter. The closing flap 30 is pushed upward by each elastic biasing mechanism 70 and is kept in its active configuration concealing the slot 64 near the wall 60 of the cover 28, without contact therewith.

The outer aesthetic appearance of the assembly 10 is therefore very satisfactory, since the receiving housing 44 is completely closed off on the one hand by the cover 28, and on the other hand by the flap 30.

When the user wishes to deploy the table 26, he opens the cover 28 to tilt it into its open configuration. He then frees the retaining mechanism 136.

Under the effect of the elastic biasing member 134, the guide members 130 are rotated relative to the carriage 104 and rise along the guide path 132, by cooperating with the rack 133.

The table 26 then moves by a combined translational movement along the axis F-F' defined by the legs 92 and rotational movement around an axis defined by the bearing points 123 on the bearing members 114, up to an intermediate position for grasping the table 26, advantageously revealing a handle.

During this movement, the rotating elements 122 of the bearing members 114 are rotated and slide in a rail 124 of the guide path 116.

The table 26 then moves laterally away from the frame 24 by simultaneous sliding and pivoting.

Each retaining blade 126 keeps the bearing member 114 in the guide path 116, enslaving the movement of the table 26 to a stationary and reproducible trajectory.

In the inclined intermediate position of the table 26, the user advantageously grasps the base panel 100 and gradually moves it away from the frame 24 until reaching the deployed horizontal position.

When the table 26 comes into contact with the closing flap 30 at the sliding members 76 of the flap 30, it pushes the closing flap 30 downward under the effect of its weight (see FIG. 5).

The closing flap 30 is guided in vertical translation relative to the console 20 owing to the mechanisms 70, in particular by sliding of each rod 79 in the base 80 against the biasing of the spring 81. The flap 30 gradually retracts against the biasing mechanism 70, by a simple translational movement, until it reaches its retracted configuration.

This greatly simplifies the structure of the layout assembly 10, since no complex mechanism is necessary to retract the closing flap 30 when the slot 64 must be freed for the passage of the table 26.

Figure 8:
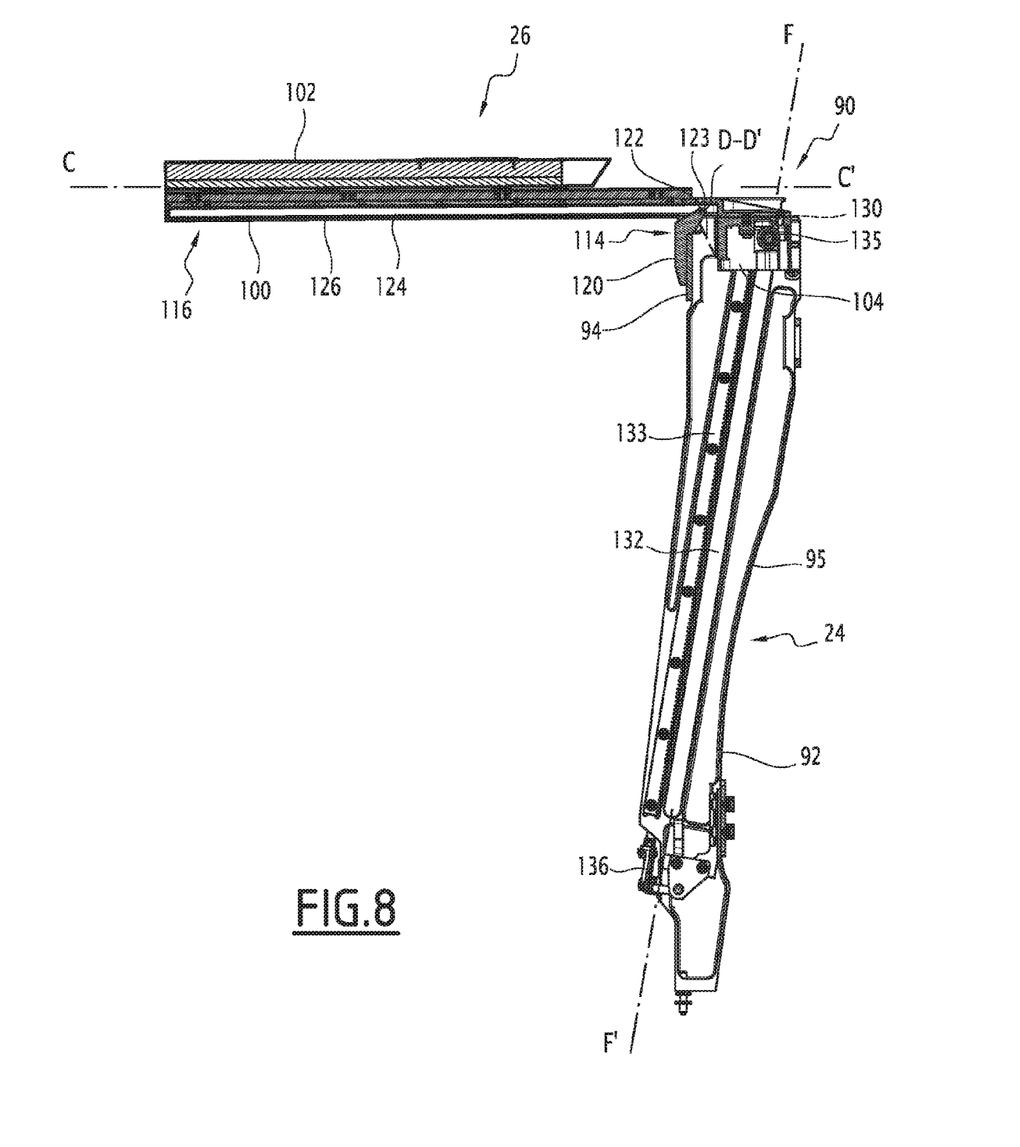
FIG. 8 is a side and partial sectional view along a vertical plane VII of the support device of FIG. 6, in the deployed horizontal position of the table.

In the deployed horizontal position, shown in FIG. 8, the table 26 protrudes horizontally along the axis C-C' perpendicular to the main axis B-B'. The carriage 104 is then positioned near the upper crosspiece 94.

In reference to FIGS. 2 and 8, the table 26 rests bearing stably on each bearing member 114, and on the sliding members 76 of the closing flap 30, by means of the base panel 100. The table 26 remains separated from the upper edge 52 of the console 20.

The user then closes the concealing cover 28. The thin upper wall region 60 is positioned above the upper surface of the base panel 100, producing an esthetic effect similar to being flush.

The base panel 100 is received in a complementary manner in the passage slot 64.

Thus, the receiving housing 44 containing the frame 24 and the guide mechanism 90 is completely concealed, which provides a very agreeable esthetic appearance for the user.

The additional panel 102 can be deployed to elongate the length of the deployed table 26.

The overall esthetic appearance of the layout assembly 10 is therefore greatly improved, both in the retracted position of the table 26 and in the deployed horizontal position of the table 26, which are the two main usage positions.

This effect is obtained particularly simply, without having to provide complex mechanisms with complicated movements, in particular in rotation.

Furthermore, the deployment kinetics of the table 26 on the frame 24 are guided appropriately by the guide mechanism 90, to ensure a reproducible trajectory and substantial stiffness during the deployment of the table 26.

The stiffness is in particular obtained by providing bearing points 123 with a globally invariable position of the table 26 on the bearing members 114 mounted on the frame 24, and by keeping these bearing members 114 in the guide paths 116 provided below the table 26.

Furthermore, the presence of the elastic biasing member 134 assists the user in the manual deployment of the table 26, particularly compactly and simply.

When the table 26 must be folded again, the movements previously described are done in the opposite order.

Alternatively, the bearing members 114 have no rotating elements 122. They are for example made from a material limiting friction, such as PTFE.

In another alternative (not shown), the bearing members 114 are made in one piece with the frame 24.

In still another alternative (not shown), the guide paths 116 protrude downward relative to the table 26, and each bearing point is defined in a notch arranged on the frame 24 to receive the guide path 116.

In one alternative, at least one jack (not shown) actuates the movement of the table 26 on the frame 24.

Also alternatively, the movement of the table 26 on the frame 24 is caused by a motor activated by the user.

In another alternative, the guide path 130 is vertical, while having an upper end laterally offset toward the rear relative to a vertical axis passing through the bearing point 123.

In still another alternative, the flap 30 is downwardly deployable from the cover 28. It can be moved by the table 26 to retract upward under the effect of the weight of the cover 28.

What is claimed is:

1. An interior layout assembly of an aircraft cabin comprising:
    a table;
    a console defining a housing for receiving the table, the receiving housing emerging through a deployment opening, the table being deployable through the deployment opening between a retracted position in the receiving housing and a deployed horizontal position;
    a cover mounted on the console, the cover being movable between an open configuration for passage of the table and a closed configuration closing off the deployment opening, the cover in the closed configuration and the console defining a passage slot between them, to receive the table in the deployed horizontal position; and
    a flap closing off the passage slot, the flap being movable by the table from an active configuration closing the passage slot to a retracted configuration freeing the passage slot during the passage of the table from the retracted position to the deployed position.

2. The assembly as recited in claim 1 further comprising at least one elastic returner for returning the closing flap to its active configuration.

3. The assembly as recited in claim 1 wherein the closing flap in the active closing configuration is situated above the closing flap in the retracted configuration.

4. The assembly as recited in claim 3 wherein the table is configured to bear on the closing flap during the passage of the table from the retracted position to the horizontal deployed position to push the closing flap downward in the retracted configuration under the effect of the weight of the table.

5. The assembly as recited in claim 1 wherein at least one of the closing flap and the table includes at least one slider for sliding of the table on the closing flap.

6. The assembly as recited in claim 1 wherein the closing flap is movable in translation between the active closing configuration and the retracted configuration.

7. The assembly as recited in claim 1 wherein the console has a stationary upper edge, downwardly defining the passage slot, the table bearing on sliders situated on the closing flap in the deployed horizontal position.

8. The assembly as recited in claim 7 wherein the table bears on the sliders without contact with the upper edge of the console.

9. The assembly as recited in claim 1 wherein the cover in the closed configuration is arranged above an upper surface of the table when the table is in the deployed horizontal position, the cover upwardly closing off the receiving housing.

10. The assembly as recited in claim 1 wherein the cover in the closed configuration is positioned above the closing flap when the table is in the retracted position, the cover upwardly closing off the receiving housing.

11. The assembly as recited in claim 1 wherein the console has an upper surface for bearing objects, an upper wall of the cover in the closed configuration being flush with the upper bearing surface.

12. The assembly as recited in claim 1 wherein the table includes a base panel and an additional panel articulated on the base panel, the additional panel being folded on the base panel during the passage of the table from the retracted position to the deployed horizontal position.

13. An interior layout method of an aircraft cabin comprising:
providing the assembly as recited in claim 1, the table being in the retracted position in the receiving housing, the closing flap being in the active configuration for closing the passage slot;
deploying the table outside the receiving housing through the deployment opening toward the deployed position; and
moving the closing flap by the table during the deployment of the table to move the closing flap to the retracted configuration.

14. The method as recited in claim 13 further comprising:
retracting the table in the receiving housing through the deployment opening toward the retracted position; and
moving the closing flap from the retracted configuration to the active configuration closing the passage slot, under the effect of an elastic biaser of the closing flap toward its active closing configuration.

15. The method as recited in claim 13 wherein the table bears on the closing flap during the deployment of the table toward the deployed horizontal position, the movement of the closing flap by the table being generated by the weight of the table pressing on the closing flap.

* * * * *